US010943204B2

United States Patent
Xu et al.

(10) Patent No.: US 10,943,204 B2
(45) Date of Patent: Mar. 9, 2021

(54) REALTIME VIDEO MONITORING APPLIED TO REDUCE CUSTOMER WAIT TIMES

(71) Applicant: INTERNATIONAL BUSINESS MACHINES CORPORATION, Armonk, NY (US)

(72) Inventors: Chang Xu, Beijing (CN); Ke Wei Sun, Beijing (CN); Junsong Wang, Beijing (CN); Yonghua Lin, Beijing (CN); Yan Gy Gong, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 36 days.

(21) Appl. No.: 16/249,381

(22) Filed: Jan. 16, 2019

(65) Prior Publication Data
US 2020/0226523 A1 Jul. 16, 2020

(51) Int. Cl.
*G06K 9/00* (2006.01)
*G06Q 10/06* (2012.01)
(Continued)

(52) U.S. Cl.
CPC ... *G06Q 10/06393* (2013.01); *G06K 9/00369* (2013.01); *G06K 9/00778* (2013.01);
(Continued)

(58) Field of Classification Search
CPC ......... G06Q 10/06393; G06Q 30/0201; G06K 9/00778; G06K 9/00369; G06T 7/246;
(Continued)

(56) References Cited

U.S. PATENT DOCUMENTS 6,195,121 B1 * 2/2001 Huang ............... G06K 9/00228
348/144
7,652,687 B2 1/2010 Sorensen
(Continued)

OTHER PUBLICATIONS

Goncalves et al., "Crowdsourcing Queue Estimations in Situ", Proceedings of the 19th ACM Conference on Computer-Supported Cooperative Work & Social Computing. Feb. 27, 2016. (pp. 1040-1051.).
(Continued)

*Primary Examiner* — Christopher M Brandt
(74) *Attorney, Agent, or Firm* — Tutunjian & Bitetto, P.C.; Joseph Petrokaitis

(57) ABSTRACT

A computer implemented method of detecting excessive customer wait times is provided. The method includes taking a headcount in a digital image obtained by a digital video camera of a monitored area, counting the number of bodies in the digital image, and rectifying the number of heads with the number of bodies to obtain a total count of persons. The method further includes determining which persons are moving and subtracting the moving persons from the total count of persons to obtain a still count, and determining which persons are workers and subtracting the workers from the still count to identify customers in the monitored area and obtain a customer count. The method further includes identifying the number of queues present in the monitored area, assigning each customer to a queue, and determining the wait time for each of the identified customers in each of the identified queues.

20 Claims, 9 Drawing Sheets

(51) Int. Cl.
*G06Q 30/02* (2012.01)
*G06T 7/246* (2017.01)

(52) U.S. Cl.
CPC ......... *G06Q 30/0201* (2013.01); *G06T 7/246* (2017.01); *G06T 2207/10016* (2013.01); *G06T 2207/30196* (2013.01); *G06T 2207/30232* (2013.01); *G06T 2207/30242* (2013.01)

(58) Field of Classification Search
CPC . G06T 2207/10016; G06T 2207/30232; G06T 2207/30242; G06T 2207/30196
See application file for complete search history.

(56) References Cited

U.S. PATENT DOCUMENTS

| | | | |
|---|---|---|---|
| 8,131,010 | B2 | 3/2012 | Senior et al. |
| 9,426,627 | B1 | 8/2016 | Logan et al. |
| 10,217,174 | B2 | 2/2019 | Ghosh et al. |
| 2011/0231419 | A1* | 9/2011 | Papke ............... G06F 16/784 |
| | | | 707/756 |
| 2015/0058049 | A1 | 2/2015 | Shaw |
| 2016/0110591 | A1* | 4/2016 | Smith ............... G06K 9/00778 |
| | | | 382/103 |
| 2016/0191865 | A1 | 6/2016 | Beiser et al. |
| 2016/0224844 | A1 | 8/2016 | Gyger et al. |
| 2017/0277956 | A1 | 9/2017 | Winter et al. |
| 2017/0302335 | A1* | 10/2017 | Sawata ............. G06Q 30/0261 |
| 2018/0033024 | A1 | 2/2018 | Latapie et al. |
| 2018/0130074 | A1* | 5/2018 | Hu ..................... G06M 11/00 |
| 2018/0136005 | A1* | 5/2018 | Forutanpour ...... G01C 21/3602 |

OTHER PUBLICATIONS

Patino et al., "Abnormal behaviour detection on queue analysis from stereo cameras", 12th IEEE International Conference on Advanced Video and Signal Based Surveillance. Aug. 25, 2015. (pp. 1-6.).

* cited by examiner

REALTIME VIDEO MONITORING APPLIED TO REDUCE CUSTOMER WAIT TIMES

BACKGROUND

Technical Field

The present invention generally relates to monitoring work areas using video monitoring, and more particularly to utilizing real time video to monitor crowd size in a work area.

Description of the Related Art

Video cameras have been used to remotely observe an area, typically to detect criminal activity and help law enforcement, as well as monitor employee productivity and customer behavior. Real time video monitoring can be used for managing, directing, and protecting people during ongoing events, where the video cameras provide the ability to observe such events from a distance. Video cameras can now be monitored by automated computer programs instead of humans, for example, using advanced video analytics to detect and determine temporal and spatial events, to detect flame and smoke, license plate number recognition software, and facial recognition software to identify people.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN can be configured for a specific application, such as pattern recognition or data classification, through such a learning process.

SUMMARY

In accordance with an embodiment of the present invention, a computer implemented method of detecting excessive customer wait times is provided. The method includes taking a headcount in a digital image using a processor device obtained by a digital video camera of a monitored area. The method further includes counting the number of bodies in the digital image using the processor device, and rectifying the number of heads with the number of bodies to obtain a total count of persons in the monitored area using the processor device. The method further includes determining which persons are moving and subtracting the number of moving persons from the total count of persons to obtain a still count. The method further includes determining which persons are workers and subtracting the number of workers from the still count to identify customers in the monitored area and obtain a customer count using the processor device. The method further includes identifying the number of queues present in the monitored area, and assigning each customer to a queue. The method further includes determining the wait time for each of the identified customers in each of the identified queues.

In accordance with another embodiment of the present invention, a system for detecting excessive customer wait times is provided. The system includes a neural network including a counter configured to take a headcount in a digital image obtained by a digital video camera of a monitored area, and configured to count the number of bodies in a digital image, and a rectifier configured to rectify the number of heads with the number of bodies to obtain a total count of persons in the monitored area. The system includes a neural network further including a motion detector configured to determine which persons are moving and subtracting the number of moving persons from the total count to obtain a still count, and an identifier configured to determine which persons are workers, subtract the number of workers from the still count to identify customers in the monitored area and obtain a customer count, and identify the number of queues present in the monitored area. The system includes a neural network further including an assignor configured to assign each customer to a queue, and a monitor configured to determine the wait time for each of the identified customers in the queue.

In accordance with yet another embodiment of the present invention, a non-transitory computer readable storage medium comprising a computer readable program for detecting excessive customer wait times is provided. The computer readable program can provide instructions for taking a headcount in a digital image obtained by a digital video camera of a monitored area, and counting the number of bodies in the digital image. The computer readable program can also provide instructions for rectifying the number of heads with the number of bodies to obtain a total count of persons in the monitored area, and determining which persons are moving and subtracting the number of moving persons from the total count to obtain a still count. The computer readable program can also provide instructions for determining which persons are workers and subtracting the number of workers from the still count to identify customers in the monitored area and obtain a customer count. The computer readable program can also provide instructions for identifying the number of queues present in the monitored area, assigning each customer to a queue, and determining the wait time for each of the identified customers in the queue.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
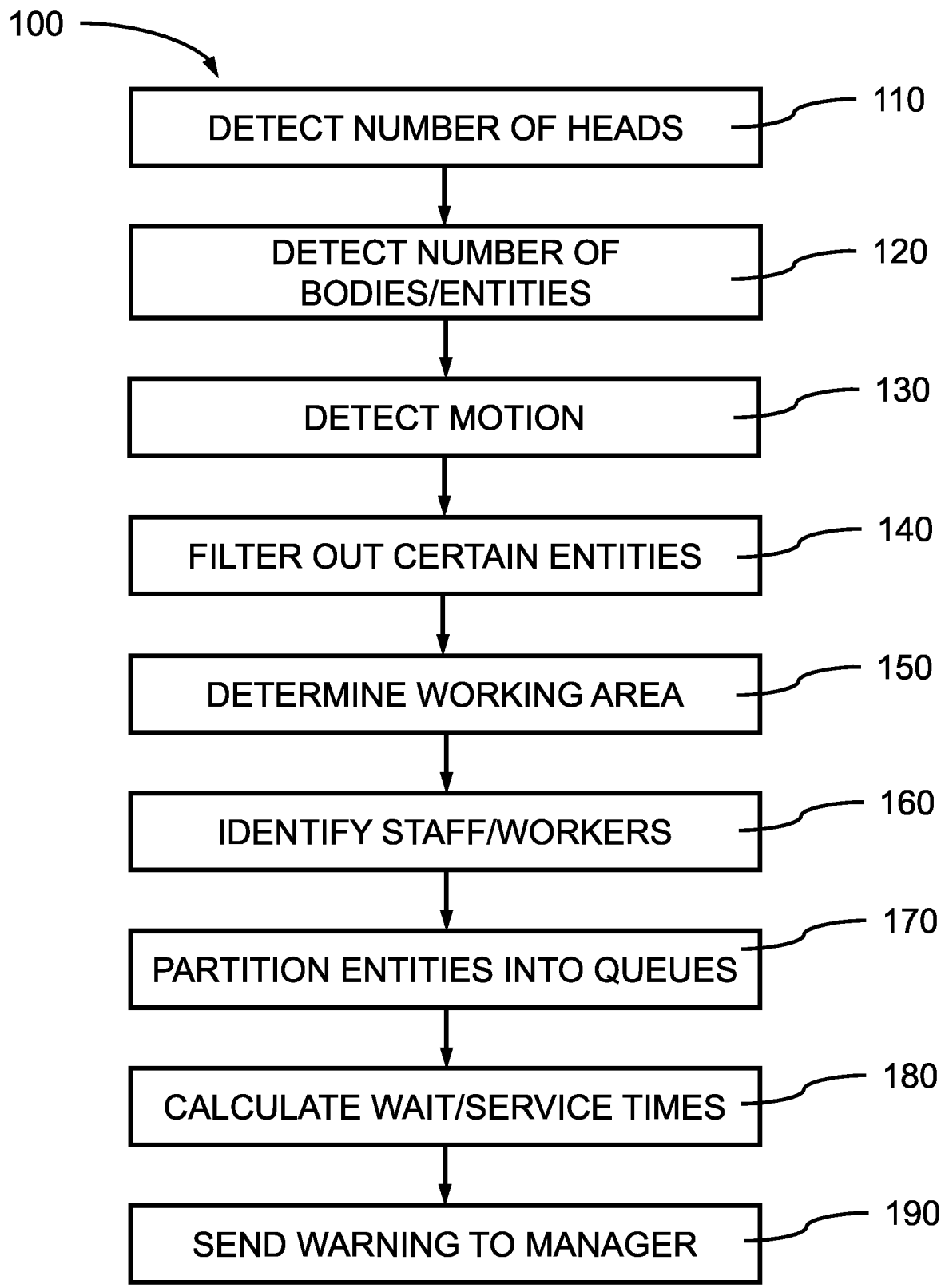
FIG. 1 is a block/flow diagram showing a method of analyzing and adjusting workloads in a customer service environment, in accordance with an embodiment of the present invention.

Embodiments of the present invention provide a method of alerting managers to over-crowded customer areas and excessive wait times. In many retail and customer service environments customers waiting for assistance and/or checkout can pile up, causing extensive delays and aggravating customers. People waiting in a line can get bored and file complaints. While a manager on duty may be able to have an impression that service is slow, such a manager may not have a good estimate or sense that the wait times are becoming excessive until it is too late and customers have become upset. A manager also may not have a good view of a customer service area, so may underestimate the number of people waiting and their wait times. Having a system that can calculate wait times of multiple customers waiting for service and alert the manager, when such wait times have exceeded a threshold before customers become upset, can help a business maintain customer satisfaction and reduce complaints.

Embodiments of the present invention provide a system of alerting managers to over-crowded customer areas and excessive wait times. Using security cameras that may already be present at a place of business and a neural network to monitor the size of a crowd waiting for service and calculating the wait times of the customers can provide a cost-effective approach of keeping customers happy. The neural network can be used for image analysis and motion analysis can be used to assess customer movement in the area to determine how quickly lines are moving.

In various instances the arrival times of customers may be random, for example, people completing their shopping in a store, or may be correlated with outside factors, for example, departure times for airplanes or busses, or people getting out of work at the same time. The amount of people waiting for service can vary throughout a day with peaks and lulls distributed throughout that time period. Waiting times can be inversely proportional to the number of people waiting and the position of individuals within the queue(s). The ability to schedule staff and render service can depend on accurately assessing the service needs of such customers, singularly or in batches, before a significant backlog builds up.

Embodiments of the present invention provide a neural network that can identify the number of people actively waiting for service and the average period of time between getting on a line (i.e., in a queue) and receiving service. The neural network can be trained to identify individual entities in a work area, and distinguish which entities are people waiting in a queue for service through image recognition using computer vision techniques. In various embodiments, high resolution cameras can be used for image capture, and the images filtered and analyzed by the neural network.

Embodiments of the present invention can use motion detection to determine which entities in a work area are moving towards a service counter staffed by service personnel in contrast to entities moving randomly and/or away from a service counter. People not waiting for service can be filtered out of the identified crowd to more accurately determine crowd size and wait times. Additional workers can be assigned to service locations to reduce the wait times.

Exemplary applications/uses to which the present invention can be applied include, but are not limited to: airport service counters, supermarket checkout lines, bus station ticket counters, bank teller lines, hotel service lines, and government service facilities (e.g., department of motor vehicles (DMV), Social Security Office, etc.).

It is to be understood that aspects of the present invention will be described in terms of a given illustrative architecture; however, other architectures, structures, and process features and steps can be varied within the scope of aspects of the present invention.

Referring now to the drawings in which like numerals represent the same or similar elements and initially to FIG. 1, a block/flow diagram of a method of analyzing and adjusting workloads in a customer service environment is shown, in accordance with an embodiment of the present invention.

In block 110, a digital camera, for example, a digital video camera monitoring an area can observe and record multiple digital images of the area. The number of digital images recorded by the camera can depend on the frame rate of the camera, where a frame is one of the many still images which compose a digital video segment (e.g., a moving picture). The digital video camera can capture the activities occurring within the camera's field of view, where the size of the field of view can be determined by the type of camera and optics/lenses employed. In various embodiments, multiple cameras can observe the same area from different vantage points for surveillance.

In various embodiments, the area being monitored by the camera(s) may be a waiting area (e.g., at an airport or bus depot), checkout lines (e.g., for a retail store), or a service line (e.g., at a bank, hotel, department of motor vehicles (DMV), etc.). The observed area within the field of view of the camera, also referred to as the monitored area, (where objects outside the field of view are not recorded when the picture is taken) may contain a number of people and/or physical objects.

In one or more embodiments, a monitoring system can identify the number of people in a waiting area. The video camera can capture the digital images of the physical area observed by the camera. The digital images can be processed by a computer system running a neural network to identify the number of heads present in the field of view (i.e., area) captured in the digital image.

In various embodiments, the captured images can be input into the neural network as a numerical array with height, width, and depth, where the height and width can be determined by the resolution and color scale of the digital image, for example: 1280 pixel width×720 pixel height with a depth of three (3) for the red, green, blue (RGB) colors for 720p resolution; 1920 pixel width×1080 pixel height and a depth of 3 for 1080p; or 3840 pixel width×2160 pixel height and a depth of 3 for 4K resolution. The numerical array can be processed by a convolutional neural network using filters, where the filters can have a width, height, and depth less than the input image, and can be applied to convert blocks of the image array into column vectors.

In various embodiments, the input image can be analyzed to identify one or more heads, where the neural network can be trained to identify heads in the image. In various embodiments, supervised learning can be used to identify heads, where all heads in an image can be labeled, and the labeled images used to train the neural network through supervised and/or unsupervised learning. With advanced object detection algorithm(s) and a stochastic gradient descent optimization method, the neural network has the capability to identify heads and ignore similar round objects. In various embodiments, since heads contain little semantic features (they are mostly similar), particular features of heads are not extracted. In various embodiments, local image patches (e.g., blocks) of the input image can each be analyzed to identify one or more heads. The identified heads can be counted to take a headcount in the digital image.

In various embodiments, the blocks and filters may have a size optimized for identifying heads in the field of view of the camera, where the resolution of the image, the distance of the camera from the objects in the field of view, and the scaling of the image can influence the number of pixels that would depict an average head. In various embodiments, for example, the heads can be 20×20 pixels of the digital image or larger, where the block size can be adjusted to optimize (e.g., increase confidence values) that all or almost all heads are correctly identified.

In various embodiments, once the heads have been identified in the input image, the number of identified heads can be counted to establish an initial estimate of people in the monitored area. Since heads may be obscured or not identified with 100% accuracy, the number of heads counted may not be identical to the exact number of people present in the monitored area.

In block 120, the number of bodies/entities in the input image can be counted.

In various embodiments, the input image can be analyzed to identify one or more bodies/entities, where the neural network can be trained to identify bodies/entities in the image. Features of a body can be extracted, for example, as a 2048 dimension vector that is not human-readable, where the extracted features can represent clothing (e.g., shirts, pants, etc.). A deep-learning neural network can be used to extract the features for building the feature vector. One or more filters can be applied to the input image to identify features of a body or entity, where not all of the features are necessarily present or observable in the image. In addition, the placement of some people in the field of view can obscure or occlude other people next to or behind them making identification of a distinct body difficult or impossible. Positioning of individuals' bodies in the image can be inconsistent, such that each block of the input image may contain no body/entity, one body/entity, or more than one body/entity, at different times. The extracted feature vector can be used to track the placement and movement of identified bodies.

In various embodiments, the blocks and filters may have a size optimized for identifying bodies/entities in the field of view of the camera, where the resolution of the image, the distance of the camera from the objects in the field of view, and the scaling of the image can influence the number of pixels that would depict an average body/entity.

In various embodiments, once the bodies/entities have been identified in the input image, the number of identified bodies/entities can be counted to establish a second estimate of people in the monitored area. Since bodies/entities may be obscured or not identified with 100% accuracy, the number of bodies/entities counted may not be identical to the exact number of people present in the monitored area, and may be different from the number of heads counted.

In one or more embodiments, the number of heads and the number of bodies/entities can be analyzed to arrive at a more accurate count of the number of people in the field of view of the digital video camera. The bodies and heads can be separately detected by a neural network. Bodies can be matched with heads based upon coinciding positioning. When a head is detected, but a corresponding body is not identified in an expected coinciding position, the system can infer that an associated body is present (but possibly occluded) to rectify the number of heads to bodies (e.g., one (1) can be added to the number of identified bodies. The number of people present in the digital image can, thereby, be reconciled in favor of the number of heads. Similarly, the system can infer that an associated head is present (but possibly occluded), when a corresponding head is not identified in an expected position for an identified body to rectify the number of bodies to heads. One (1) can be added to the number of identified heads. A Hungarian algorithm can be used to match heads with bodies and/or bodies to heads (i.e., rectified). A total number of people can then be determined from the rectified number of heads to bodies and rectified number of bodies to heads. If a head and a body can be matched based upon coinciding positioning, they can be identified (labeled) as belonging to same person. For heads (or bodies) that are unmatched, they can be identified (labeled) as belonging to new persons. Both head set and body set can be divided into matched subsets and unmatched subsets. In various embodiments, a final number of people can be calculated as the matched subset+the subset of unmatched heads+the subset of unmatched bodies.

In one or more embodiments, the system can draw boxes around the rectified and/or matched head/body set to form body boxes. Features can be extracted from the detected body boxes by the neural network. The neural network can be trained to identify the rectified head/body set to form body boxes through supervised and/or unsupervised learning.

In block 130, the motion of individual persons in the field of view can be determined.

In various embodiments, once the number of people in the input image is determined, the position of the people in the image can be determined based on their relative pixel positions (i.e., height, width) making up their heads/bodies in the input image. Movement of the people and objects in the video can be detected by identification of the change of physical position of the object. In various embodiments, a velocity vector can be associated to each image point, and a collection of such velocity vectors can be used to form a 2D motion field. By analyzing changes in the pixel positions in subsequently captured digital images by the digital video camera, the relative motion of each person or object can be determined. In various embodiments, optical flow analysis can be used on multiple sequential frames to detect motion using a low dimensional subspace and subspace constraints. Movement can be detected through shifting positions of objects in sequential frames.

In various embodiments, the motion of some people and objects relative to people and/or objects that remain in essentially the same position can be used to identify which people are standing still and which people are moving towards or away from the portions of the monitored area.

In block 140, the people identified as moving can be subtracted from the count of people waiting for service. The people (body boxes) that are moving can be subtracted from the total count of people (body boxes) to obtain a still count.

People that are moving may be filtered out of a queue count to reduce the number of people identified as actually waiting for service, where an assumption can be made that people waiting in a queue will exhibit less movement than people that are entering, leaving, or passing through the area. In various embodiments, people moving away from a section of the area that has been identified as the point(s) of service in the monitored area can be identified as having received service, and can be removed from the queue count. People initially moving towards the point(s) of service may be joining a queue, but such people may not be added to a queue count until such people have been counted and identified as not moving, since some people may simply be passing through the camera's field of view.

In block 150, a section of the monitored area can be identified as a work area where service personnel are interacting with customers to provide service.

In one or more embodiments, features of a work area can be identified by a trained neural network, where objects such as counters, desks, monitors/computer terminals, cash registers, scales, etc. can be used to identify a work area within the monitored area. The objects and features defining a work area may be distinguished by a fixed position within the digital video camera's field of view. In various embodiments, fixed objects, such as counters, desks, and walls, can be used to identify a boundary between a work area and a customer service area. The boundary may then be used to identify people in a queue from people performing customer service tasks (i.e., workers) by determining which side of a boundary a person is on.

In block 160, people can be subdivided into customers and staff/workers, where staff/workers can be identified based on observable features.

In one or more embodiments staff and workers can be identified by the trained neural network based on distinguishing features, for example, staff/workers may be wearing uniforms that can be identified by the neural network. In addition, staff/workers may be positioned within a work area. Using the distinguishing features, the people can be subdivided into customers and staff/workers even though staff/workers may be standing still, in contrast to the people filtered out as moving. Moving workers may have already been filtered out based on their motion.

People identified as workers may be subtracted from the total number of people, so the staff/workers can be removed from the queue count. The system can recognize that the people providing service are not people that are waiting for service, determine which persons are workers, and subtract the number of workers from the still count to identify customers in the monitored area and obtain a customer count. Not all workers may be providing service.

In block 170, the people identified as customers waiting for service can be partitioned into a number of queues.

In one or more embodiments, the number of staff/workers identified as providing service can be used to determine the number of queues present in the monitored area. Staff/workers can be identified as being associated with a point-of-service (e.g., a point-of-sale (e.g., cash register), a check-in counter, etc.), where staff/workers within a threshold distance of a work area feature (e.g., monitors/computer terminals, cash registers, scales, etc.) can be identified as an anchor point of a queue. Staff/workers previously identified as moving can be eliminated from the calculation of the number of anchor points. The queues can act as service channels, where there can be a plurality of service channels in parallel with each providing the same service facilities and performing the same service functions, so several customers can be services at the same time.

In various embodiments, customers can get into formal and/or informal queues, where a formal queue can be a roped off line, and an informal queue can be a self-assembled arrangement of customers in front of a point of service. The neural network can be trained to identify feature of a formal queue, including, but not limited to, arranged ropes and stanchions, lines and markings on the floor, and/or signed hung over different sections of a counter (e.g., window #1, window #2, etc.).

Filters can be applied to the digital images to identify such features, and for training the neural network.

In one or more embodiments, once the number of queues has been identified and the staff/workers and moving people subtracted from the number of people waiting for service, the remaining people can be partitioned into the identified number of queues. In various embodiments, the number of people waiting for service can be divided approximately evenly by the identified number of staffed anchor points to determine the number of people in each queue. In various embodiments, the number of people in each formal queue can be counted. In various embodiments, people waiting in informal queues can be partitioned into a number of implied queues based on their relative positions to each other and the anchor points, as if the people (body boxes) were within imaginary lines or ropes.

In various embodiments, clustering algorithms can be used to place people in an informal queue into a number of separate queues, where clustering can assign each non-moving, non-worker person to an identified or implied queue. In one or more embodiments, a greedy algorithm can be used to assign non-moving, non-worker persons to a queue based on heuristic scores. In various embodiments, imaginary auxiliary lines representing an approximate direction of each of the queues can be determined. A greedy partition algorithm can be applied to partition people into different queues based on their nearest distances from each of the one or more imaginary auxiliary lines.

In various embodiments Gaussian Mixture Models (GMMs) or DBSCAN are not used for the clustering because these methods are density based, and the people (body boxes) can be dense and occluded, so there may not be obvious boundaries between queues or directions to the queues. Previous density-model based clustering can fail to partition people into different queues.

In block 180, each of the people (body box) assigned to a queue can be monitored to determine the wait/service time for that queue. The trajectories (i.e., distance and direction travelled by a person in a queue) of each of the identified people in a queue can be tracked, where the individual trajectories can be long or short. The velocity of each of the identified people can be calculated as a function of the time spent in the queue and the distance travelled over the person's trajectory. The distance can be to an identified anchor point for the particular queue.

In one or more embodiments, the persons in each identified queue can be tracked until they become moving people. Each person can be tracked for each time they move and the distance moved from their previous position to determine tracklets (e.g., a vector with distance and direction for each intermittent move). In various instances, a person will move from their position in the queue to the approximate position of the person directly ahead of them in the queue. While persons moving up in a queue may be identified as moving for some small duration, they will subsequently be recognized as being still at a different position within the same queue at a subsequent time. The time between each such move and the distance moved can be used to calculate a velocity. The distance between the representative person and the anchor point of the queue they are identified with can be used to calculate an approximate wait time. The same velocity can be used to calculate an approximate wait time for each person in the queue. In various embodiments, statistical methods can be used to estimate average service time by tracking representatives in the queue. In various embodiments, the system can collect many short-term movements (e.g., Δd movement towards service counter within Δt time) for one or more people in the line, where obtaining short-term tracklets can be much easier than obtaining long-term trajectories. The average velocity ((v=Δd/Δt) can then be calculated with statistical data. An average waiting time can be predicted as queue length, for example, a distance the last person in the queue must travel, over average velocity.

In one or more embodiments, the time spent servicing each person can be determined and stored to calculate an average service time for customers waiting in the queue.

In block 190, a warning can be sent to a manager to open up more points-of-service and form additional queues to reduce the average wait times.

In one or more embodiments, the calculated approximate wait time of the last person in the queue, or an average wait time for all the people in a particular queue can be compared to a threshold wait time to determine if the wait time for the queue is excessive. If the calculated wait time is at or above the threshold wait time, a warning can be sent to a manager, for example, by text, e-mail, or robocall. The warning may be displayed on a computer monitor of the system. In response, the manager can assign one or more additional workers to a point-of-service to increase the number of queues and reduce the wait times on each of the queues. The manager may be at a location different than the location of the workers.

Figure 2:
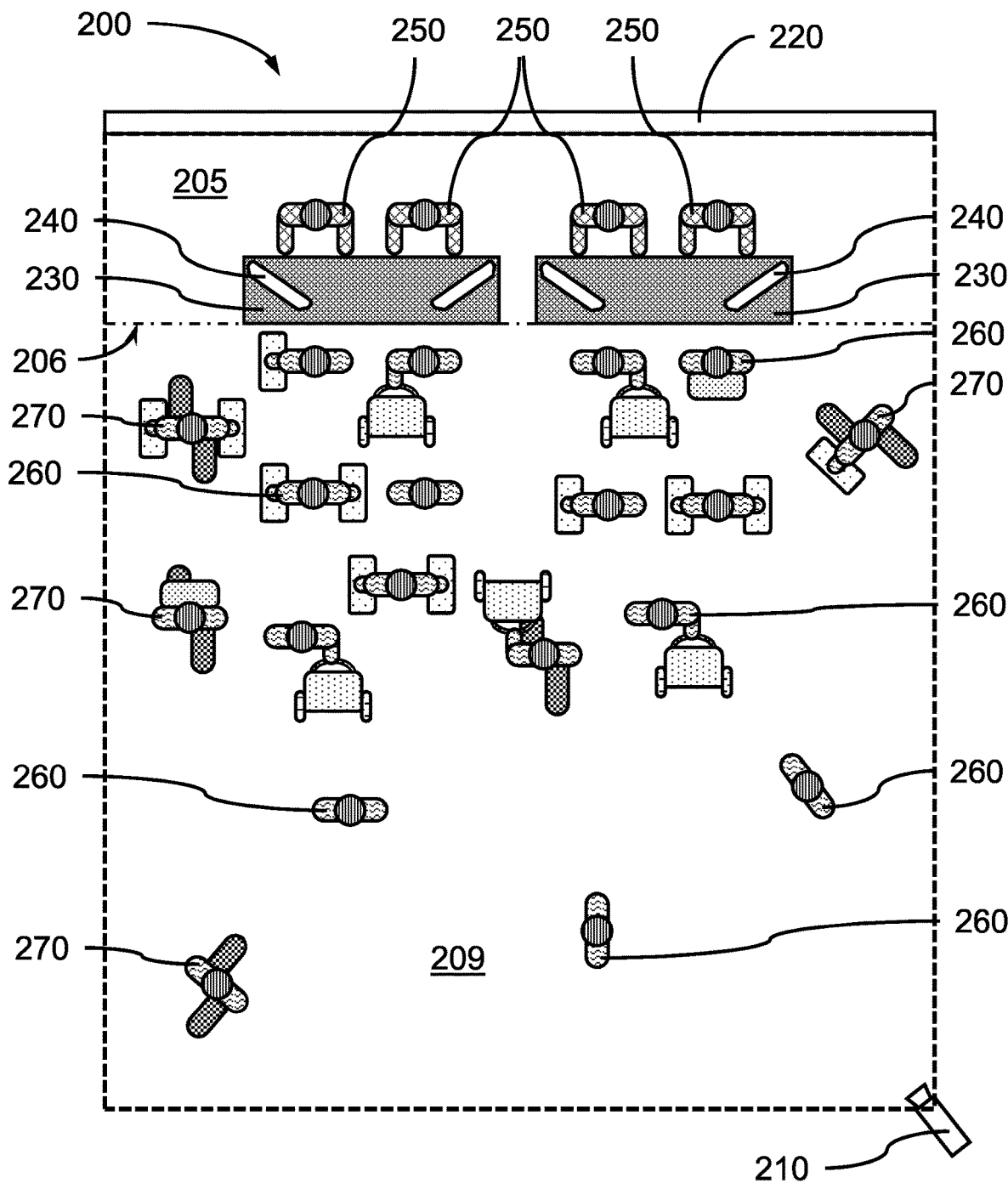
FIG. 2 is a top view of a work area of a customer service environment showing a monitored area including customers and workers, in accordance with an embodiment of the present invention.

FIG. 2 is a top view of a work area of a customer service environment showing a monitored area including customers and workers, in accordance with an embodiment of the present invention.

In various embodiments, a digital video camera 210 can observe a monitored area 200 including a work area 205 and a customer service area 209. The monitored area 200 can be the area within the digital video camera's 210 field of view, from which images can be collected.

In one or more embodiments, the work area can be bounded by one or more walls 220 or other physical delineation (e.g., counter, table, etc.), a service counter 230 (e.g., table, desk, checkout conveyor, etc.), and/or a point-of-service 240 (e.g., cash register, computer terminal, etc.). The work area may be defined virtually by having the monitoring system recognize imaginary lines 206 separating customers 260, 270 and the customer area 209 from the working area 205. Workers can be present in the work area 205 or the customer service area 209. Customers 260, 270 can be present in the customer service area 209.

In one or more embodiments, customers 260, 270 can be still 260 or moving 270, where still customers 260 may be waiting in a queue or simply standing around. Moving customers 270 may have already received service. Customers may be carrying, pulling, or wearing luggage.

In various embodiments, the digital video camera can be a high resolution video camera having a resolution, for example, of 1280×720 pixels for 720p resolution; 1920×1080 pixels for 1080p; or 3840×2160 pixels for 4K resolution. The digital video camera can be a color camera (e.g., RGB), a low light camera, a high speed camera (e.g., frame rates in excess of 250 frames per second), or a combination thereof. Higher speed and higher resolution cameras are also contemplated.

Figure 3:
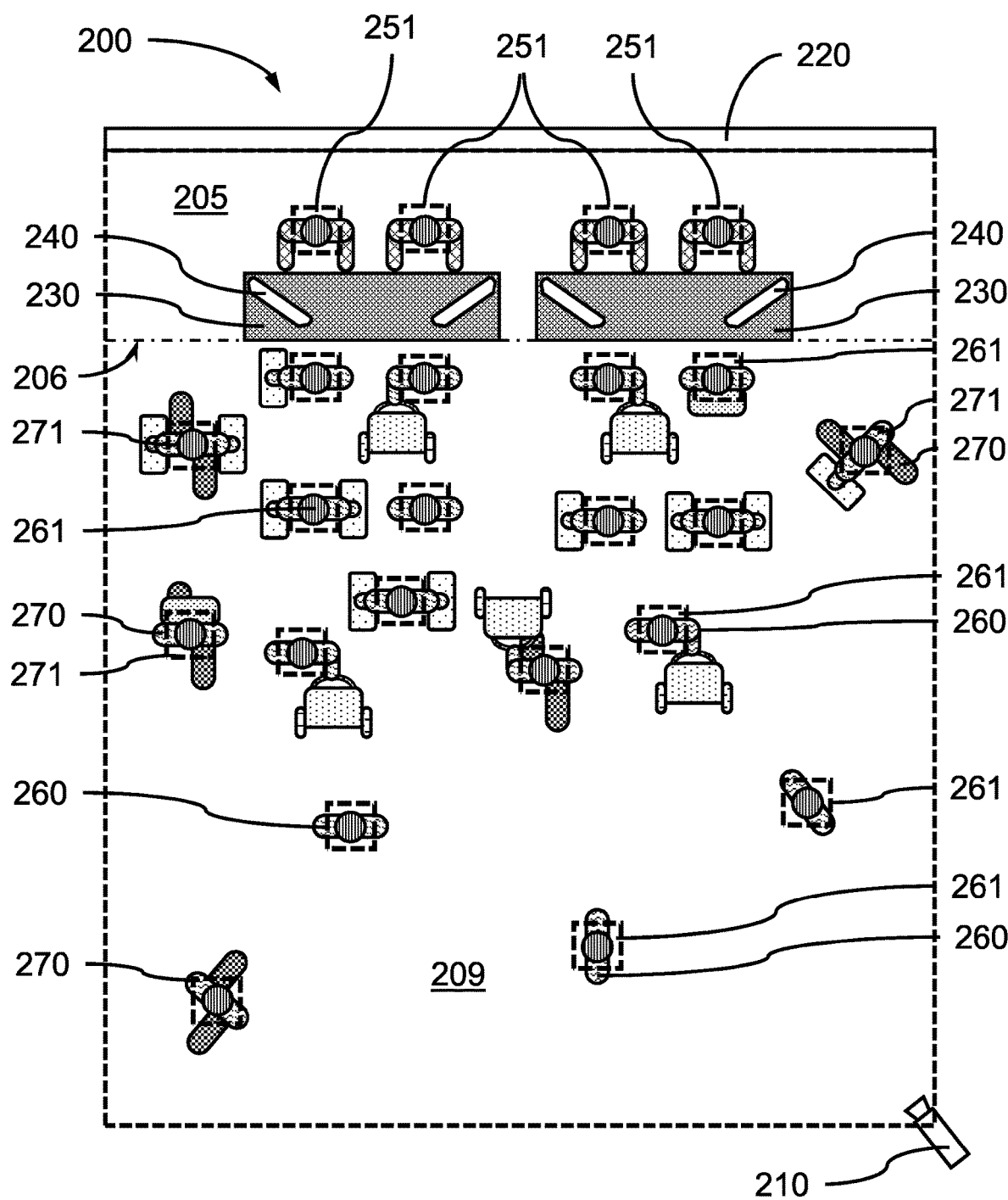
FIG. 3 is a top view of a work area of a customer service environment showing taking a headcount, in accordance with an embodiment of the present invention.

FIG. 3 is a top view of a work area of a customer service environment showing taking a headcount, in accordance with an embodiment of the present invention.

In one or more embodiments, the heads 251, 261, 271 of each person in the monitored area can be detected by a neural network using image recognition and/or filtering. In various embodiments, sub-blocks of a digital image captured by the video camera 210 can be analyzed to identify the heads present in the camera's field of view. In various embodiments, the neural network may not identify the direction that the head is facing, so only the presence of a head may be counted. In various embodiments, the neural network can be a convolutional neural network.

In various embodiments, the heads can be identified for both moving people and still people to obtain a total count of all persons in the digital image, including the heads of workers 251, the heads of still customers 261, and the heads of moving customers 271. The head count may not be a totally accurate count of all heads in the monitored area 200 because of individual's heads being obscured or occluded by other people and objects, for example, people may be in a direct line to the video camera 210, kneeling behind someone tying their shoe, etc.

Figure 4:
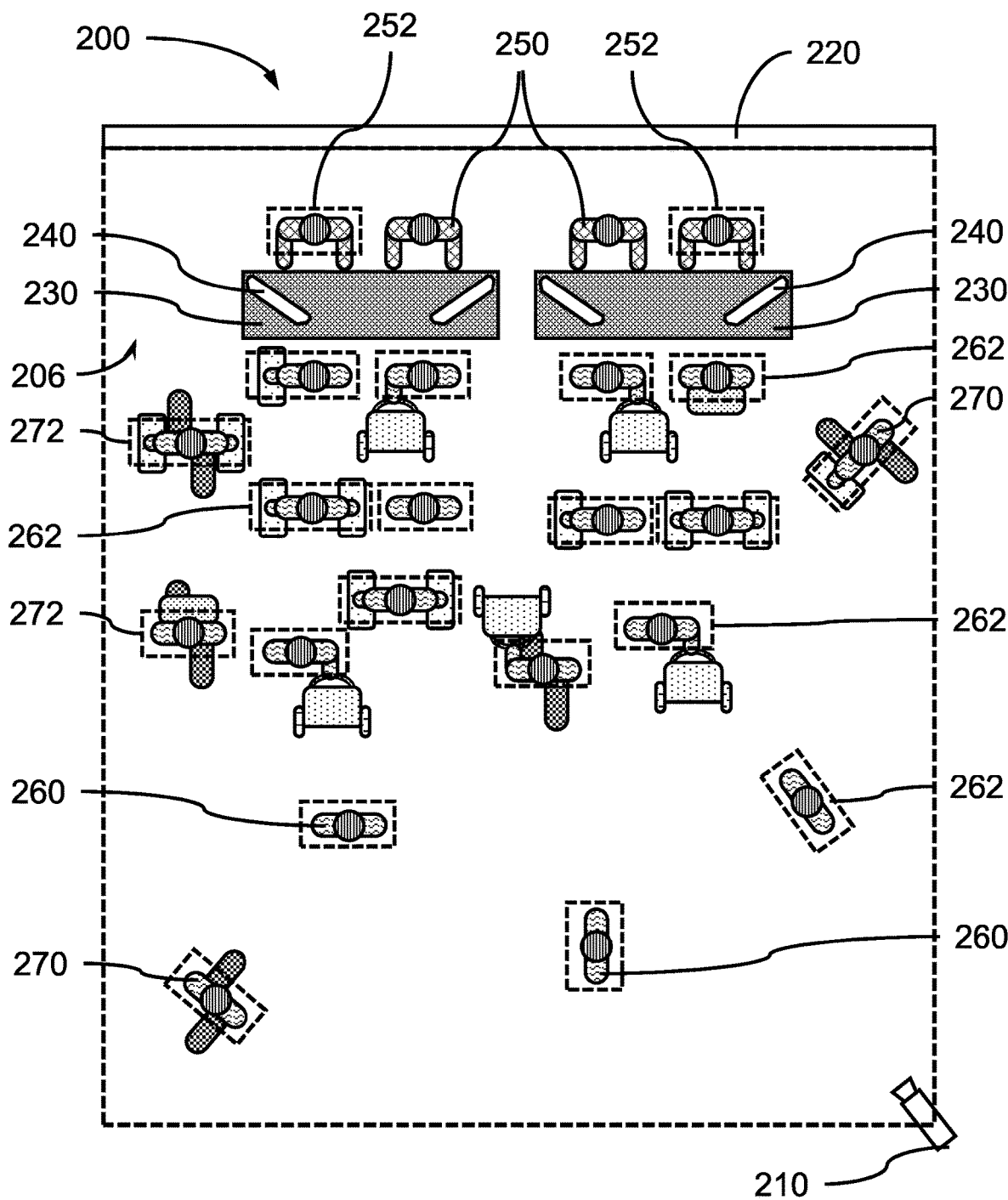
FIG. 4 is another top view of a work area of a customer service environment showing entity counting, in accordance with an embodiment of the present invention.

FIG. 4 is another top view of a work area of a customer service environment showing entity counting, in accordance with an embodiment of the present invention.

In one or more embodiments, an analysis of the digital image can be conducted to identify the bodies 252, 262, 272 of each person in the monitored area 200. In various embodiments, the bodies can be identified for both moving people and still people to obtain a total count of all persons in the digital image, including the bodies of workers 252, the bodies of still customers 262, and the bodies of moving customers 272. The analysis of the digital image for bodies can occur before or after the analysis of the digital image for heads.

In one or more embodiments, the count of heads can be compared to the count of bodies and the numbers rectified to obtain a number of actual people in the monitored area 200 with a high confidence.

Figure 5:
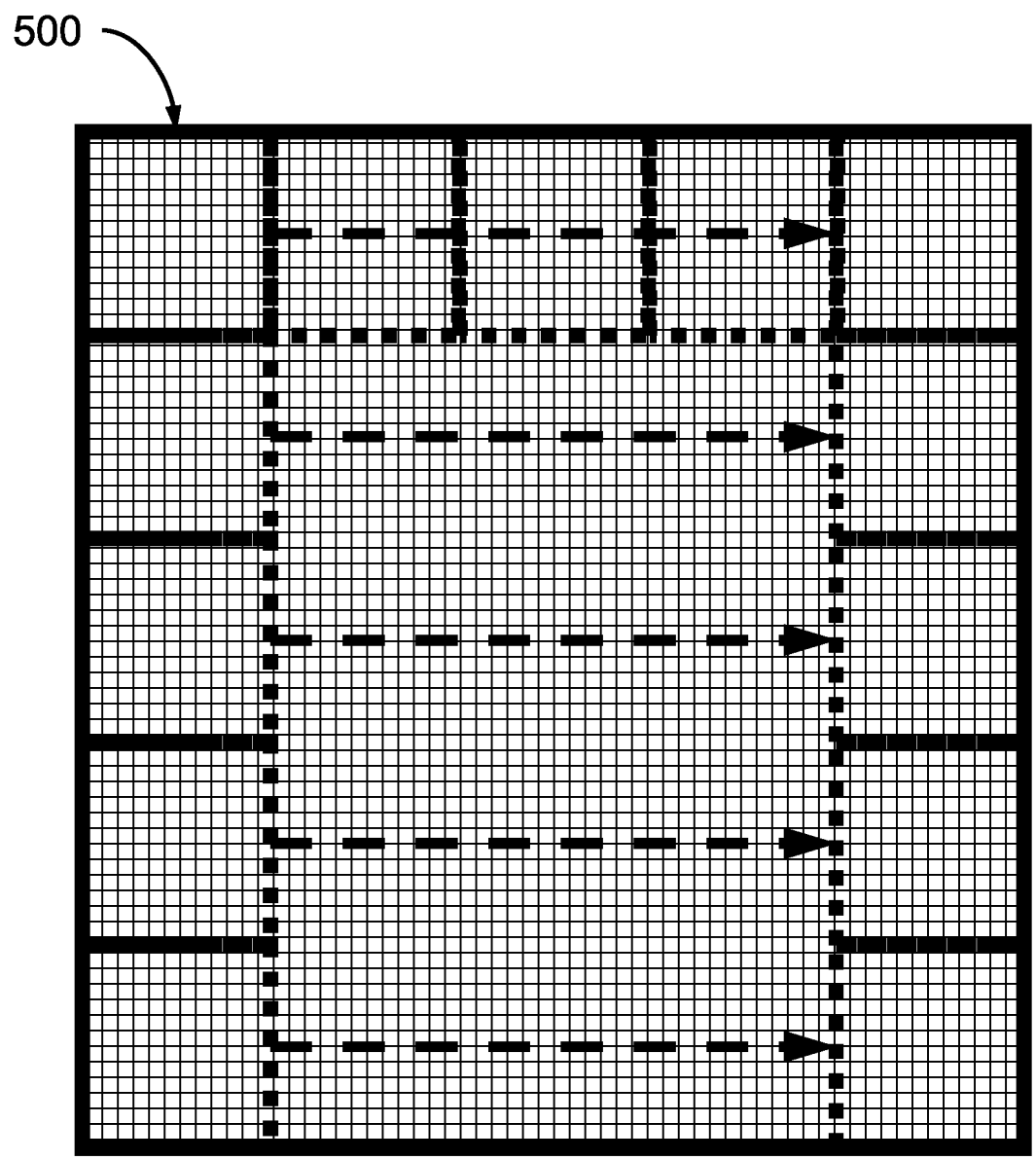
FIG. 5 is an illustration of a pixelated capture image from a digital camera having a filter applied by a convolutional neural network, in accordance with an embodiment of the present invention.

FIG. 5 is an illustration of a pixelated capture image from a digital camera having a filter applied by a convolutional neural network, in accordance with an embodiment of the present invention.

In one or more embodiments, the neural network can be a convolutional neural network with a convolutional layer that can apply filters to sub-blocks of the pixels of the digital image(s) 500 to analyze different sections of the digital image 500 for head or body features on which the neural network has been trained. Filters can also be applied to identify customers, workers, anchor points, and other features observed within the monitored area. Multiple filters can be applied to identify different features in the captured images to increase the accuracy and confidence in the analysis. In other embodiments, one or more filters can be applied to the entire image without a step-and-repeat process, or the whole image can be fed into the neural network. Labels can be assigned to the different features.

Figure 6:
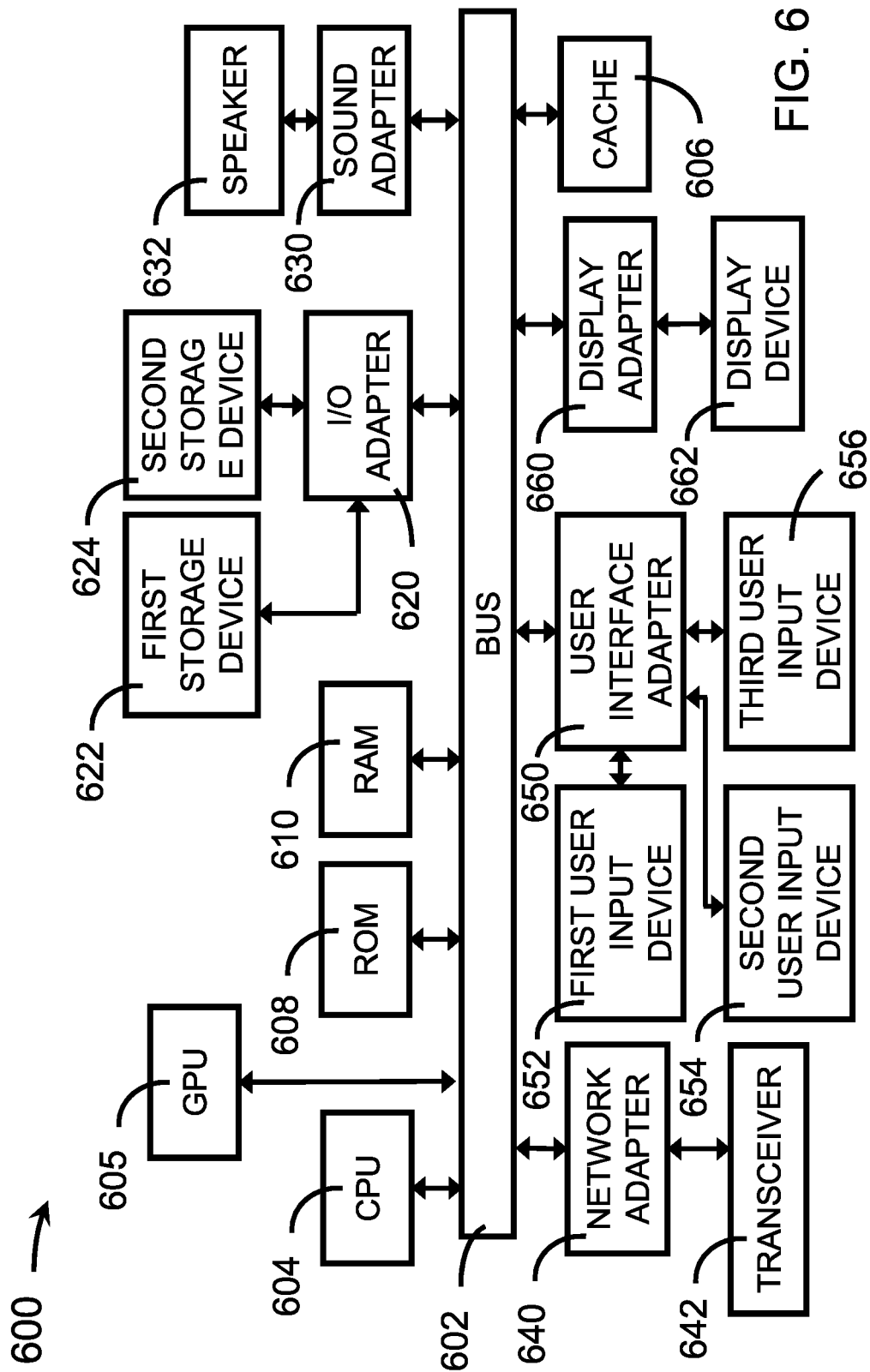
FIG. 6 is an exemplary processing system to which the present methods and systems may be applied, in accordance with an embodiment of the present invention.

FIG. 6 is an exemplary processing system 600 to which the present methods and systems may be applied in accordance with an embodiment of the present invention.

The processing system 600 can include at least one processor (CPU) 604 and at least one graphics processing (GPU) 605 that can perform vector calculations/manipulations operatively coupled to other components via a system bus 602, where the CPU and GPU can alone or in combination can form a processor device. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, can be operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 354, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 can be used to input and output information to and from system 600.

In various embodiments, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Moreover, it is to be appreciated that system 600 is a system for implementing respective embodiments of the present methods/systems. Part or all of processing system 600 may be implemented in one or more of the elements of FIGS. 1-5. The system 600 can be electrically and communicatively coupled to a digital video camera 210, and configured to receive digital image from the digital video camera 210. Further, it is to be appreciated that processing system 600 may perform at least part of the methods described herein including, for example, at least part of method 100 of FIG. 1.

Figure 7:
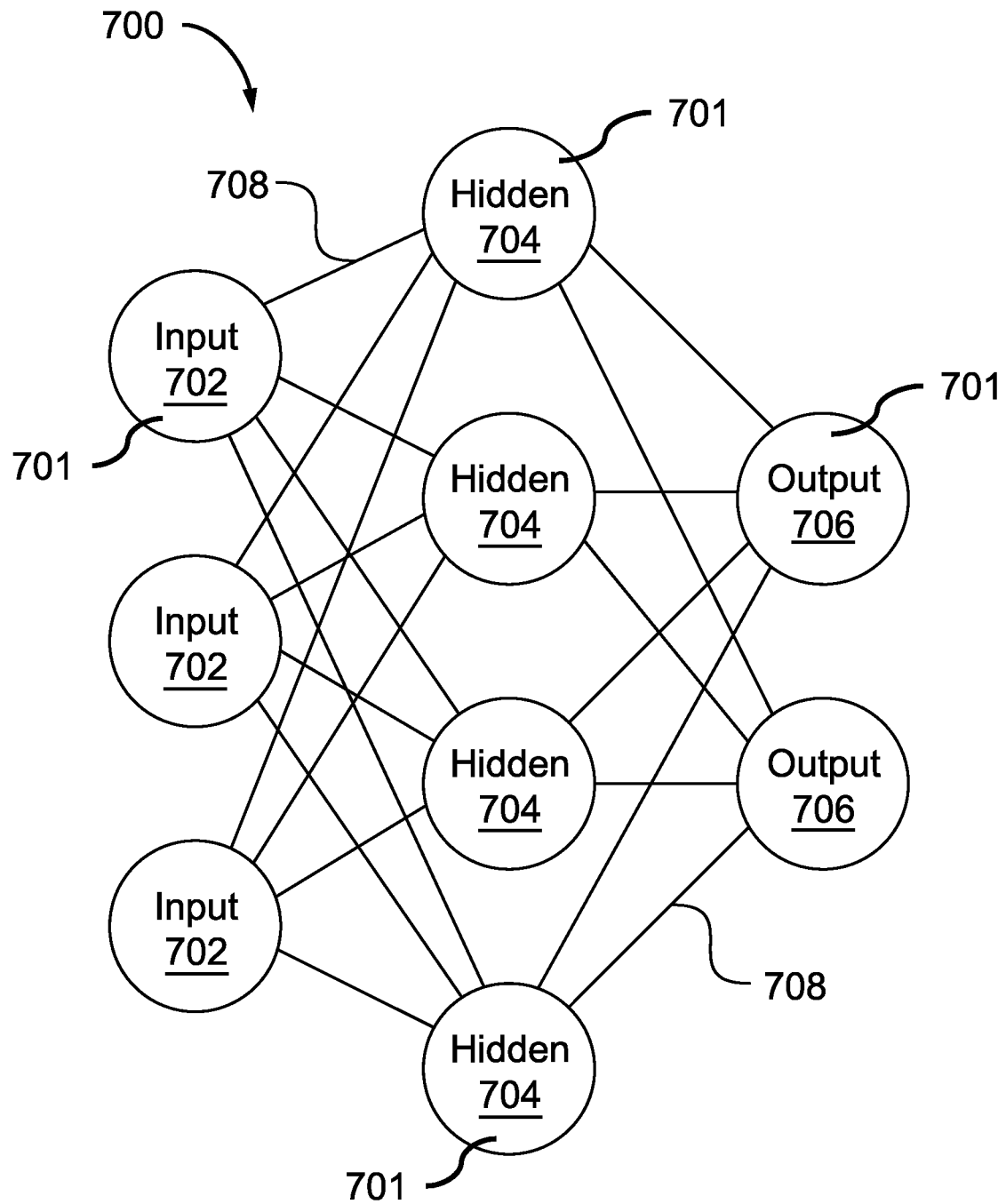
FIG. 7 is a block diagram illustratively depicting an exemplary neural network, in accordance with an embodiment of the present invention.

FIG. 7 is a block diagram illustratively depicting an exemplary neural network, in accordance with an embodiment of the present invention.

ANNs demonstrate an ability to derive meaning from complicated or imprecise data and can be used to extract patterns and detect trends that are too complex to be detected by humans or other computer-based systems. A neural network 700 may include a plurality of neurons/nodes 701, and the nodes 701 may communicate using one or more of a plurality of connections 708. The neural network 700 may include a plurality of layers, including, for example, one or more input layers 702, one or more hidden layers 704, and one or more output layers 706. In an embodiment, nodes 701 at each layer may be employed to apply any function (e.g., input program, input data, etc.) to any previous layer to produce output, and the hidden layer 704 may be employed to transform inputs from the input layer (or any other layer) into output for nodes 701 at different levels.

This represents a "feed-forward" computation, where information propagates from input neurons 702 to the output neurons 706. Upon completion of a feed-forward computation, the output is compared to a desired output available from training data. The error relative to the training data is then processed in "feed-back" computation, where the hidden neurons 704 and input neurons 702 receive information regarding the error propagating backward from the output neurons 706. Once the backward error propagation has been completed, weight updates are performed, with the weighted connections 708 being updated to account for the received error.

Figure 8:
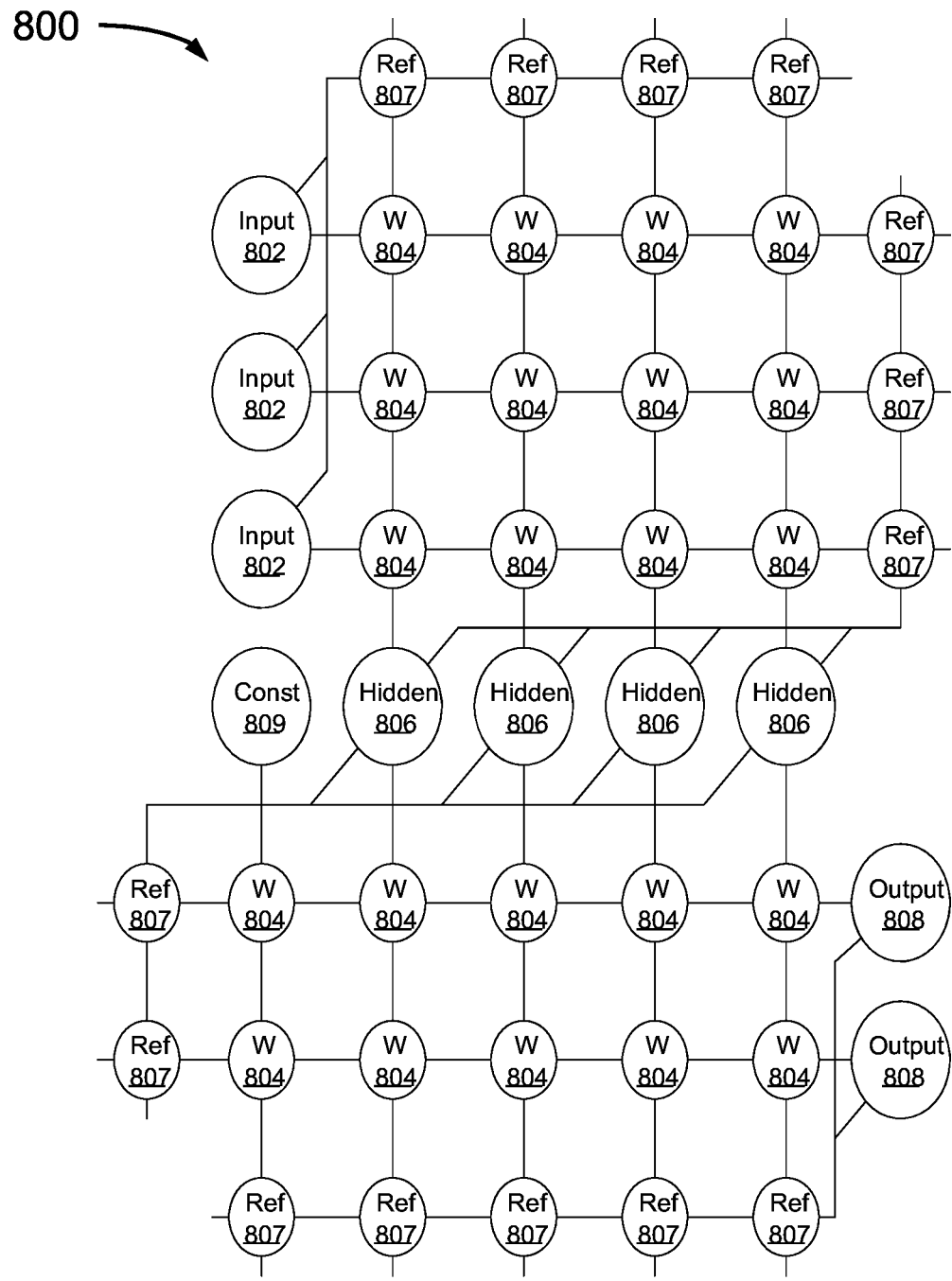
FIG. 8 is a block diagram illustratively depicting an exemplary artificial neural network (ANN) architecture 800, in accordance with an embodiment of the present invention.

FIG. 8 is a block diagram illustratively depicting an exemplary artificial neural network (ANN) architecture 800, in accordance with an embodiment of the present invention.

It should be understood that the present architecture 800 is purely exemplary and that other architectures or types of neural network may be used instead. During feed-forward operation, a set of input neurons 802 each provide an input voltage in parallel to a respective row of weights 804. The weights 804 each have a settable resistance value, such that a current output flows from the weight 804 to a respective hidden neuron 806 to represent the weighted input. The current output by a given weight is determined as $I=V/r$, where V is the input voltage from the input neuron 802 and r is the set resistance of the weight 804. The current from each weight adds column-wise and flows to a hidden neuron 806. A set of reference weights 807 have a fixed resistance and combine their outputs into a reference current that is provided to each of the hidden neurons 806. Because conductance values can only be positive numbers, some reference conductance is needed to encode both positive and negative values in the matrix. The currents produced by the weights 804 are continuously valued and positive, and therefore the reference weights 807 are used to provide a reference current, above which currents are considered to have positive values and below which currents are considered to have negative values.

As an alternative to using the reference weights 807, another embodiment may use separate arrays of weights 804 to capture negative values. Each approach has advantages and disadvantages. Using the reference weights 807 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 804 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 806 use the currents from the array of weights 804 and the reference weights 807 to perform some calculation. The hidden neurons 806 then output a voltage of their own to another array of weights 804. This array performs in the same way, with a column of weights 804 receiving a voltage from their respective hidden neuron 806 to produce a weighted current output that adds row-wise and is provided to the output neuron 808.

It should be understood that any number of these stages may be implemented, by interposing additional layers of arrays and hidden neurons 806. It should also be noted that some neurons may be constant neurons 809, which provide a constant voltage to the array. The constant neurons 809 can be present among the input neurons 802 and/or hidden neurons 806 and are only used during feed-forward operation.

During back propagation, the output neurons 808 provide a voltage back across the array of weights 804. The output layer compares the generated network response to training data and computes an error. The error is applied to the array as a voltage pulse, where the height and/or duration of the pulse is modulated proportional to the error value. In this example, a row of weights 804 receives a voltage from a respective output neuron 808 in parallel and converts that voltage into a current which adds column-wise to provide an input to hidden neurons 806. The hidden neurons 806 combine the weighted feedback signal with a derivative of its feed-forward calculation and stores an error value before outputting a feedback signal voltage to its respective column of weights 804. This back propagation travels through the entire network 800 until all hidden neurons 806 and the input neurons 802 have stored an error value.

During weight updates, the input neurons 802 and hidden neurons 806 apply a first weight update voltage forward and the output neurons 808 and hidden neurons 806 apply a second weight update voltage backward through the network 800. The combinations of these voltages create a state change within each weight 804, causing the weight 804 to take on a new resistance value. In this manner the weights 804 can be trained to adapt the neural network 800 to errors in its processing. It should be noted that the three modes of operation, feed forward, back propagation, and weight update, do not overlap with one another.

Figure 9:
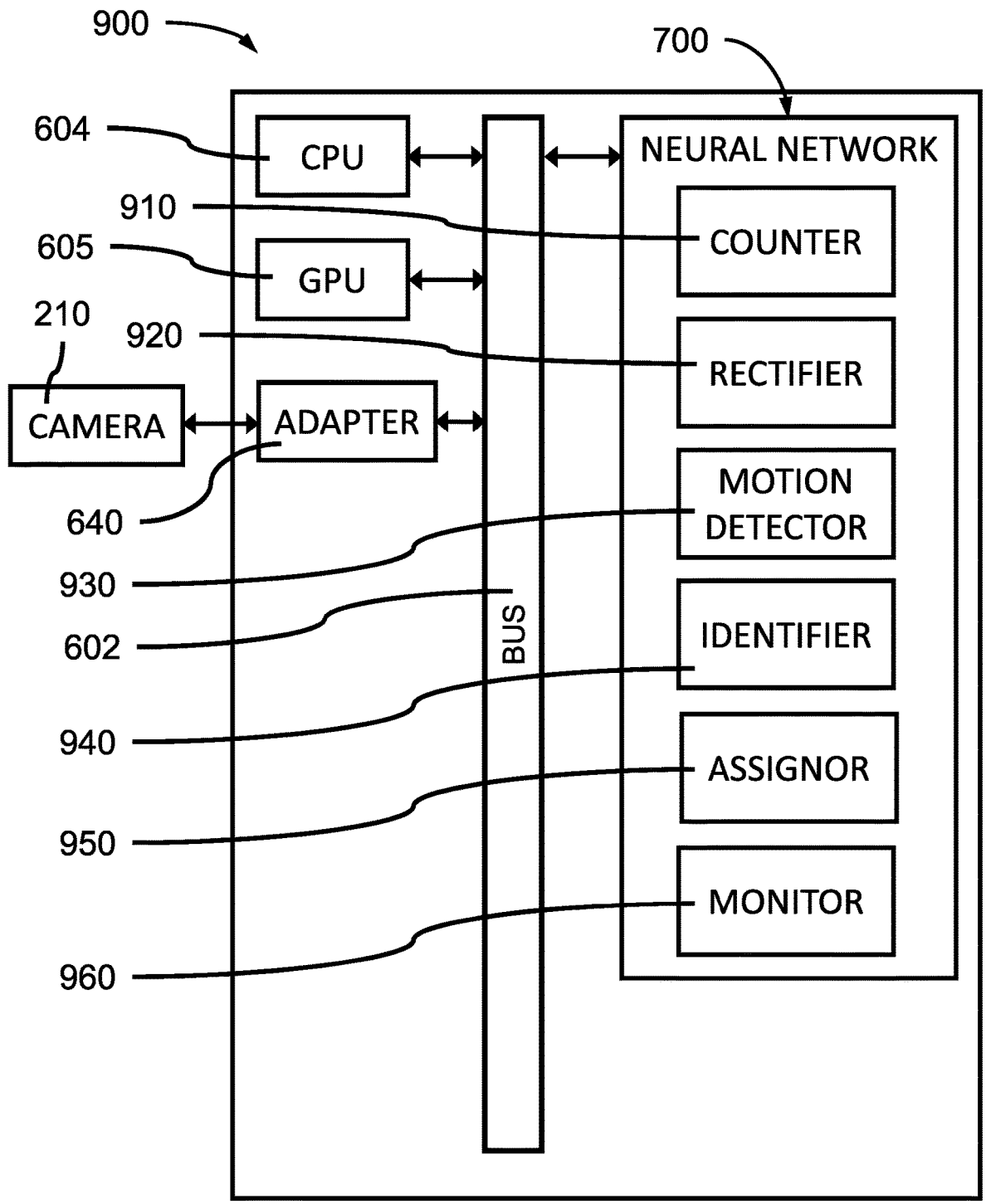
FIG. 9 is an exemplary processing system configured to implement a method 100 of detecting excessive customer wait times, in accordance with an embodiment of the present invention.

FIG. 9 is an exemplary processing system configured to implement a method 100 of detecting excessive customer wait times, in accordance with an embodiment of the present invention.

In one or more embodiments, the processing system 900 can be a computer system 600 implementing a neural network 700 to perform a computer implemented method of detecting excessive customer wait times.

In various embodiments, the neural network 700 can include a counter 910 that can be configured to count the number of heads in a digital image 500 obtained by a digital video camera of a monitored area 200. The a counter 910 can also be configured to count the number of bodies in a digital image. The counter 910 can include a convolutional layer of a convolutional neural network that applies one or more filters to a digital image 500 to detect the features of a head and/or body, as well as other features.

In various embodiments, the neural network 700 can include a rectifier 920 configured to rectify the number of heads with the number of bodies to obtain a total count of persons in the monitored area.

In various embodiments, the neural network 700 can include a motion detector 930 configured to determine which persons are moving and subtracting the number of moving persons from the total count to obtain a still count.

In various embodiments, the neural network 700 can include an identifier 940 configured to determine which persons are workers, subtract the number of workers from the still count to identify customers in the monitored area and obtain a customer count, and identify the number of queues present in the monitored area.

In various embodiments, the neural network 700 can include an assignor 950 configured to assign each customer to a queue.

In various embodiments, the neural network 700 can include a monitor 960 configured to determine the wait time for each of the identified customers in the queue.

In various embodiments, an adapter 640 of the system 900 can be connected to and in electronic communication with a digital video camera 210 can observe a monitored area 200 including a work area 205 and a customer service area 209.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and computer implemented method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method of detecting excessive customer wait times, comprising:
taking a headcount in a digital image using a processor device obtained by a digital video camera of a monitored area;
counting the number of bodies in the digital image using the processor device;

rectifying the number of heads with the number of bodies to obtain a total count of persons in the monitored area using the processor device;

determining which persons are moving and subtracting the number of moving persons from the total count of persons to obtain a still count;

determining which persons are workers and subtracting the number of workers from the still count to identify customers in the monitored area and obtain a customer count using the processor device;

identifying the number of queues present in the monitored area;

assigning each customer to a queue; and determining the wait time for each of the identified customers in each of the identified queues.

2. The computer implemented method of claim 1 further comprising, comparing the wait time for each of the customers to a threshold wait time to determine whether the wait time is excessive.

3. The computer implemented method of claim 2 further comprising, sending a warning to a manager that the wait time is excessive to initiate the placement of an additional worker to create an additional queue.

4. The computer implemented method of claim 1, wherein each customer is assigned to a queue using a greedy algorithm.

5. The computer implemented method of claim 4, wherein the number of queues present in the monitored area is identified by determining which workers are associated with an anchor point.

6. The computer implemented method of claim 5, wherein determining the wait time for each of the identified customers is done by obtaining short-term tracklets, and calculating identified customer velocities in the queue to which the identified customer(s) are assigned.

7. The computer implemented method of claim 6, wherein determining which persons are moving is done by analyzing changes in the pixel positions in subsequently captured digital images obtained by the digital video camera.

8. A system for detecting excessive customer wait times, comprising:

a neural network including a counter configured to take a headcount in a digital image obtained by a digital video camera of a monitored area, and configured to count the number of bodies in a digital image;

a rectifier configured to rectify the number of heads with the number of bodies to obtain a total count of persons in the monitored area;

a motion detector configured to determine which persons are moving and subtracting the number of moving persons from the total count to obtain a still count;

an identifier configured to determine which persons are workers, subtract the number of workers from the still count to identify customers in the monitored area and obtain a customer count, and identify the number of queues present in the monitored area;

an assignor configured to assign each customer to a queue; and a monitor configured to determine the wait time for each of the identified customers in the queue.

9. The system of claim 8, wherein the monitor is further configured to compare the wait time for each of the customers to a threshold wait time to determine whether the wait time is excessive.

10. The system of claim 9, wherein the monitor is further configured to send a warning to a manager that the wait time is excessive to initiate the placement of an additional worker to create an additional queue.

11. The system of claim 8, wherein each customer is assigned to a queue using a greedy algorithm.

12. The system of claim 11, wherein the number of queues present in the monitored area is identified by determining which workers are associated with an anchor point.

13. The system of claim 12, wherein determining the wait time for each of the identified customers is done by obtaining short-term tracklets, and calculating identified customer velocities in the queue to which the identified customer(s) are assigned.

14. The system of claim 13, wherein determining which persons are moving is done by analyzing changes in the pixel positions in subsequently captured digital images obtained by the digital video camera.

15. A non-transitory computer readable storage medium comprising a computer readable program for detecting excessive customer wait times, wherein the computer readable program when executed on a computer causes the computer to perform the steps of:

taking a headcount in a digital image obtained by a digital video camera of a monitored area;

counting the number of bodies in the digital image;

rectifying the number of heads with the number of bodies to obtain a total count of persons in the monitored area;

determining which persons are moving and subtracting the number of moving persons from the total count to obtain a still count;

determining which persons are workers and subtracting the number of workers from the still count to identify customers in the monitored area and obtain a customer count;

identifying the number of queues present in the monitored area;

assigning each customer to a queue; and determining the wait time for each of the identified customers in the queue.

16. The computer readable program of claim 15, further comprising the step of comparing the wait time for each of the customers to a threshold wait time to determine whether the wait time is excessive.

17. The computer readable program of claim 16, further comprising the step of sending a warning to a manager that the wait time is excessive to initiate the placement of an additional worker to create an additional queue.

18. The computer readable program of claim 15, wherein each customer is assigned to a queue using a greedy algorithm.

19. The computer readable program of claim 18, wherein the number of queues present in the monitored area is identified by determining which workers are associated with an anchor point.

20. The computer readable program of claim 19, wherein determining the wait time for each of the identified customers is done by obtaining short-term tracklets, and calculating identified customer velocities in the queue to which the identified customer(s) are assigned, and wherein determining which persons are moving is done by analyzing changes in the pixel positions in subsequently captured digital images obtained by the digital video camera.

* * * * *